Aug. 24, 1926.
G. W. SALMON
AUTOMOBILE HEATER APPLIANCE
Filed Nov. 10, 1923
1,597,113
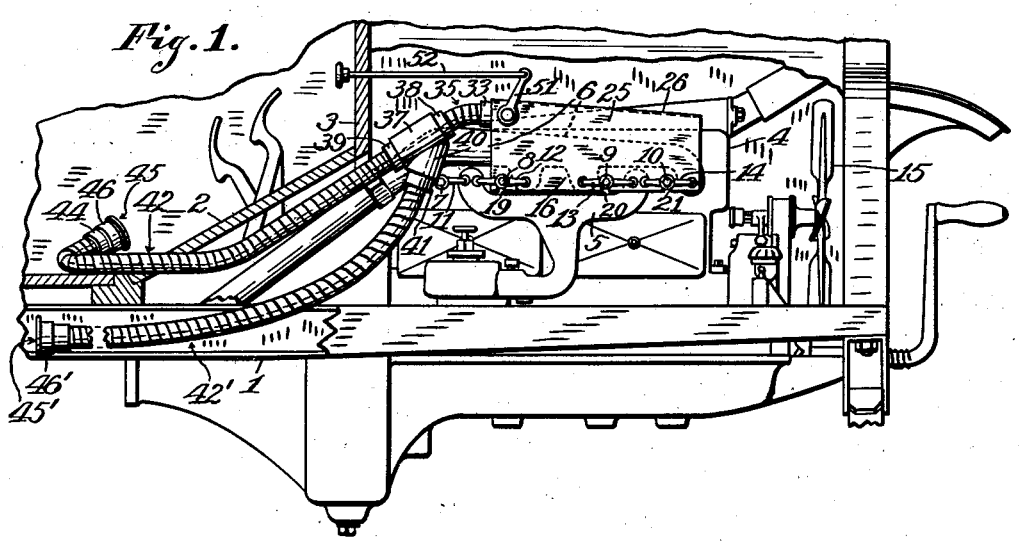
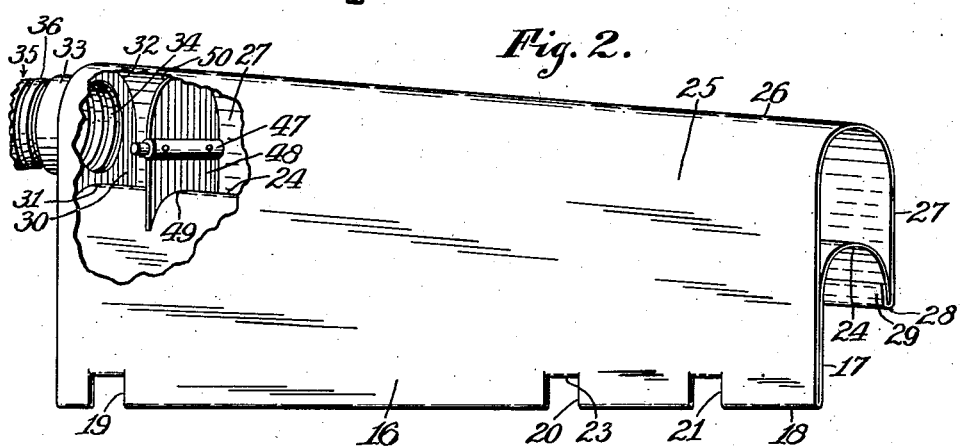
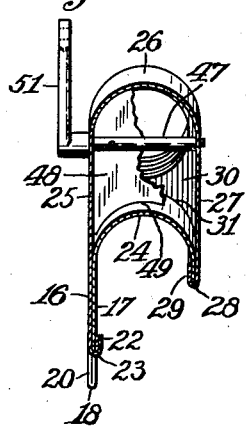
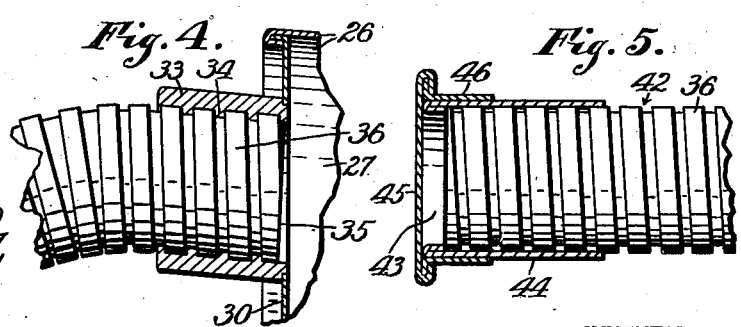
INVENTOR:
George W. Salmon,
BY
E. T. Silvius,
ATTORNEY.

Patented Aug. 24, 1926.

1,597,113

UNITED STATES PATENT OFFICE.

GEORGE W. SALMON, OF INDIANAPOLIS, INDIANA.

AUTOMOBILE HEATER APPLIANCE.

Application filed November 10, 1923. Serial No. 673,894.

This invention relates to an appliance whereby clean and measurably pure heated atmospheric air may be obtained and used for heating a compartment or compartments in an automobile, the invention having reference more particularly to an appliance of the above-mentioned character that is designed to be applied to the exhaust manifold of an explosion engine, particularly of the type that is used in a popular automobile, for causing air to be heated by radiation of heat from exhaust gases.

An object of the invention is to provide an improved automobile heater appliance of the above-mentioned character that may be constructed at small cost, and be adapted to be quickly applied to an automobile in available space without requiring special tools for installation, and which may be quickly removed if desired in the warm season of the year.

Another object is to provide an improved automobile heater appliance which shall be so constructed as to be adapted for ready regulation of heat, particularly so that heat may be directed to the feet of an operator or a passenger and permit the heat to be directed to different points as may be desired for the comfort of the operator or passenger.

A further object is to provide a heater appliance which shall permit of construction of inexpensive stock material, which shall be strong and not liable to depreciate materially with age, which may be applied to an explosion engine without requiring new devices for securing it in place, nor alteration of the engine in any manner, and which shall be durable and economical in use.

With the above-mentioned and other objects in view, the invention consists in a heater oven of novel construction adapted to be securely mounted upon an engine exhaust manifold, for heating air, and an improved air outlet or conduit for conducting the heated air under regulation from the oven for use; the invention consisting further in the parts and combinations and arrangements of parts as hereinafter particularly described and further defined in the claims appended hereto.

Referring to the drawings,—Figure 1 is a fragmentary sectional elevation of an automobile showing particularly the explosion engine thereof and the application and arrangement of the improved heater appliance; Fig. 2 is a perspective view of the oven structure of the appliance on an enlarged scale and partially broken away; Fig. 3 is a transverse section of the oven structure; Fig. 4 is a fragmentary sectional detail showing associated parts of the appliance; and, Fig. 5 is a sectional detail showing other associated parts of the appliance.

Similar reference characters in the different figures of the drawings indicate corresponding elements or features of construction herein referred to in detail.

In the drawings the numeral 1 indicates an automobile frame, 2 the inclined portion of the floor of the automobile body rearward of the "dash" or instrument board 3, forward of which is a conventional explosion engine 4 provided with an intake manifold 5 and an exhaust manifold 6. Commonly the engine is provided with clamp bolts or studs 7, 8, 9 and 10 arranged in a horizontal row, to which clamp bars 11, 12, 13 and 14 are connected, respectively, whereby the two manifolds are secured in place, as is understood; and a rotary fan 15 is arranged forward of the engine and designed to force atmospheric air rearward to the engine.

The oven structure comprised in the invention preferably is mainly composed of a single sheet of metal, one side of the structure having a laminated base portion comprising two plates 16 and 17 integrally connected together at their normal lower portions by a turned-over portion 18 to constitute the bottom of the base portion in which are notches 19, 20 and 21 suitably spaced apart to receive the clamp bolts or studs 8, 9 and 10 respectively, when the base portion is inserted under the clamp bars. In forming the notches the metal is slitted at two places for each notch and the metal between the slits is turned back against the inner plate 17 so as to provide a stiff supporting portion 22 and rounded seat portion 23 to rest upon the clamp bolts or studs. The sheet of metal of which the plate 17 is formed is curved over and away from the outer plate 16 so as to constitute an arched oven bottom 24 adapted to conform approximately to the top of the exhaust manifold 6. The heater oven has an outer or front side plate 25 that extends upward integrally from the base plate 16, the metal sheet being turned over to constitute an archshaped top or roof 26, the sheet extending downward to constitute an inner or rear side plate 27 which has a bottom curved portion 28 extending under the lower edge of the bottom 24, and a lip 29 extending up against the inner side of the bottom. Thus a separate oven chamber is formed to be arranged upon the exhaust manifold, the forward end of the oven chamber being open to receive atmospheric air. The rearward end of the oven chamber has a head 30 fixed therein that has a curved bottom 31 conforming to the curvature of the bottom 24 and a curved top 32 conforming to the curvature of the top 26. The head is provided with an outward extending outlet neck 33 having internal screw threads 34 with which a conduit of suitable length is connected for conducting heated air from the oven chamber to the operator's compartment in the automobile. When the automobile body has two compartments the conduit comprises a short pipe section 35 which preferably is of the flexible type of tubing, composed of spirally wrapped sheet metal of well known construction, which has spiral external ribs practically forming screw threads 36 which engage the threads 34 as the section is turned and screwed into the neck 33. A Y fitting 37 is provided which has an inlet neck 38 that is screwed onto the section 35, the neck being like the neck 33, and the fitting has an outlet neck 39 also similar to the neck 33, and the fitting comprises a side branch 40 having a neck 41 also similar to the neck 33. A flexible pipe section 42 of suitable length is screwed into the neck 39 and extends through a suitable opening in the floor 2 of the vehicle. Preferably the end of the section 42 has a finishing ring 43 connected thereto and may have a collar 44 fixed thereto and forcibly pressed over the end portion of the pipe section to reinforce the section. Also the end of the section preferably has a removable closure cap 45 having a sleeve 46 that is pressed over the collar 44 with sufficient force to frictionally hold it in place. A conduit or distributing pipe 42' similar to the pipe 42 is screwed into the neck 41 and may extend to any desired portion of the automobile, as to the rearward compartment, and it preferably has the closure cap 45' provided with the sleeve 46'.

For regulating the supply of heated air a special regulating valve is arranged in the oven chamber and comprises a shaft 47 horizontally supported by the side plates 25 and 27 in proximity to the head 30 and it has a valve 48 secured thereto, the valve having a curved bottom 49 corresponding to the curvature of the chamber bottom 24, and a curved top 50 corresponding to the curvature of the chamber top 26; and an arm 51 is secured to the shaft and has a controlling rod 52 connected thereto that extends through the instrument board or "dash" 3.

In assembling the appliance the clamp bars 12, 13 and 14 are slightly loosened, after which the base portion of the oven is inserted behind the bars until the seat portions 23 rest upon the clamp bolts or studs that are provided for securing the clamp bars in place and so as to securely clamp the base portion of the oven to the manifolds, permitting the oven bottom 24 to rest upon the exhaust manifold. The apparatus may be removed when not needed as easily as it is applied for use, as is apparent.

In practical use, during operation of the explosion engine the exhaust manifold walls become highly heated and the bottom 24 of the oven becomes heated also. The fan 15 forces atmospheric air through the oven chamber in which the air becomes heated and is forced out through the distributing pipes from which the closure caps are removed when heat is needed. The rod 52 is suitably adjusted for adjusting the valve 48 whereby the flow of heated air through the oven is regulated. In some cases the regulating valve might be omitted from the structure to lessen the cost thereof, and the closure caps may be applied temporarily to the distributing pipes until more heat is desired, which may be obtained by removing the caps.

What is claimed as new is:—

1. An automobile heater comprising a sheet metal member arched to fit the top of the engine exhaust manifold, a second similarly shaped member spaced above the first to form an air-heating casing, the two members being integrally connected at the normally outer edges and joined at the edges adjacent to the engine by an upturned flange of the upper member, and a rear end wall provided with an air-outlet.

2. An automobile heater comprising a sheet metal member arched to fit the top of the engine exhaust manifold, a second similarly shaped member spaced above the first to form an air-heating casing, the two members being integrally connected at the normally outer edges and joined at the edges adjacent to the engine by an upturned flange of the upper member, the portions of said two members being slitted where they are integrally connected and the metal of the members between each two adjacent slits upturned to constitute notches to receive portions of the manifold-securing bolts for support, a rear end wall provided with an air-outlet neck, and a regulating valve arranged between said members adjacent to said end wall, the bottom and the top of said valve being curved in conformity to the arched portions of said members.

In testimony whereof, I affix my signature on the 1st day of November, 1923.

GEORGE W. SALMON.